United States Patent [19]

Sivertsen

[11] 4,235,037
[45] Nov. 25, 1980

[54] FISH LINE SINKER

[75] Inventor: John W. Sivertsen, Minneapolis, Minn.

[73] Assignee: Carlton F. Peterson, Rush City, Minn. ; a part interest

[21] Appl. No.: 27,510

[22] Filed: Apr. 5, 1979

[51] Int. Cl.$^3$ .............................................. A01K 95/00
[52] U.S. Cl. .................................. 43/44.91; 43/44.95
[58] Field of Search .................. 43/44.89, 44.9, 44.91, 43/44.92, 44.93, 44.95

[56] References Cited

U.S. PATENT DOCUMENTS

| | | | |
|---|---|---|---|
| 522,167 | 6/1894 | Rawlings | 43/44.9 |
| 2,570,293 | 10/1951 | Vadnais | 43/44.91 |
| 2,579,713 | 12/1951 | Tolle | 43/44.91 |
| 2,849,827 | 9/1958 | Gardiner | 43/44.9 |
| 3,096,599 | 7/1963 | Baron | 43/44.9 |
| 3,808,728 | 5/1974 | Ratte | 43/44.91 |
| 3,867,783 | 2/1975 | Simpson | 43/44.91 |
| 3,955,305 | 5/1976 | Roberts | 43/44.91 |

Primary Examiner—Nicholas P. Godici
Assistant Examiner—K. Bradford Adolphson
Attorney, Agent, or Firm—Burd, Bartz & Gutenkauf

[57] ABSTRACT

A fish line sinker includes an elongated sinker body having a central longitudinal opening extending therethrough and having a longitudinally extending slot open from one end of the central opening to the other to the outside of the sinker body. A fish line retaining clip has a pair of ears, each one pivotally mounted with respect to one of the ends of the central opening in the sinker body, the retaining clip having a longitudinally extending bow integrally connected between these ears. Each ear is provided with a fish line receiving slot outwardly positioned on it, the slot being of shape and size to receive a fish line and to position the fish line within the sinker body central opening when the retaining clip is aligned on the sinker body opposite the longitudinally extending sinker body slot, the fish line receiving slots in the retaining clip ears being of shape and size to confine the fish line within the body central opening when the clip is aligned with the body slot. Means is provided to tend to maintain the retaining clip in alignment with the sinker body slot while the sinker and the fish line are being used for their intended purpose.

3 Claims, 10 Drawing Figures

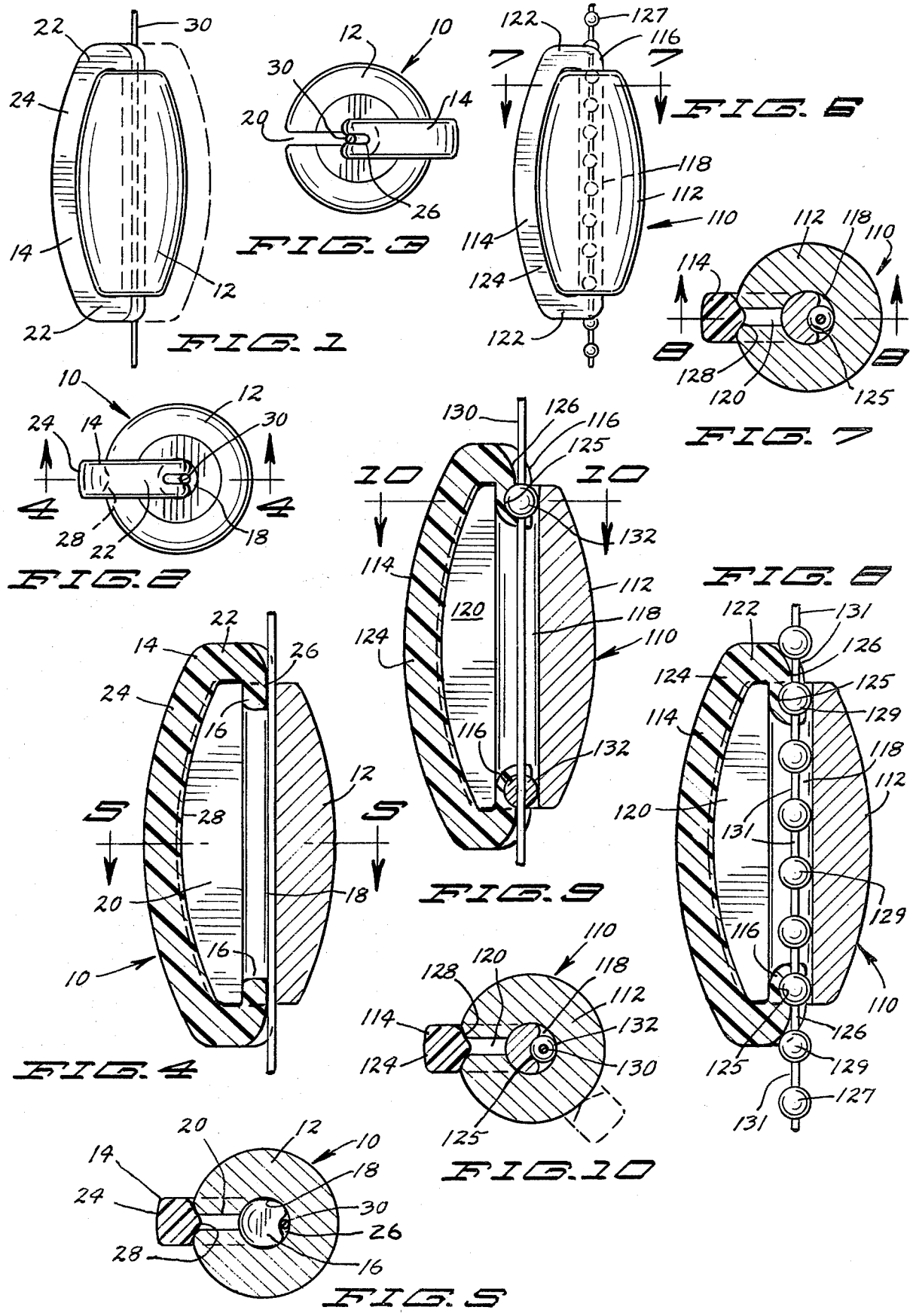

FISH LINE SINKER

BACKGROUND OF THE INVENTION

This invention has relation to relatively heavy weights called sinkers which are attached to or around fish lines for the purpose of sinking the fish bait toward the bottom of the body of water being fished.

In some modes, it is desired that the fish line sinker slide freely along the fish line; while in other modes it is desirable that the sinker be affixed against sliding to a portion of the fish line or leader.

Presently fish line sinkers come in a number of different shapes or conditions. For example, (1) the sinker of lead or other suitable relatively heavy material has a continuous opening or hole all the way through it, and must be placed on the fish line without a leader or fishing lure or bait or hook on the line; (2) the sinker has an open eye at one end thereof, can be fastened fixedly to one place on the fish line without taking the bait and hook and leader off of the line, but cannot be connected to the fish line to slide along it without taking the leader and hook, etc. off of the line; and (3) the sinker is provided with a longitudinal groove with ears at either end thereof which can be bent up to allow the fish line to be placed in the groove and then bent down to clamp the fish line onto the sinker, and suffers from the difficulty that these ears tend to break off after only several uses.

What was needed before the present invention was a fish line sinker which could be used indefinitely and which could be attached to and removed from the fish line without damage to the sinker or the line and without the necessity of removing the fish line from the leader, hook, artificial bait, etc., etc.

Applicant has made no preliminary search of the prior art in the U.S. Patent and Trademark Office; but has been a recreational fisherman using fish line sinkers and being aware of what is available in the marketplace for a major portion of his life. Applicant and those in privity with him know of no prior art which anticipates the claims made in this application.

BRIEF SUMMARY OF THE INVENTION

A fish line sinker includes a sinker body having a central longitudinal opening extending through it and includes a longitudinally extending slot open from one end to the other of the central opening to the outside of the sinker body. A fish line retaining clip has two ears, each one pivotally mounted with respect to one end of the sinker body central opening, the clip including a longitudinally extending bow integrally connected between the ears.

Each of the retaining clip ears is provided with a fish line receiving slot on the outer end of the ear positioned and shaped to receive a fish line and to position it within the sinker body central opening when the retaining clip is aligned on the sinker body opposite the longitudinally extending sinker body slot, the fish line receiving slot being of shape and size to confine the fish line within the sinker body central opening when the retaining clip is aligned with the sinker body slot.

In the form of the invention shown, a retaining clip is made of a material which has sufficient resilience so that its ears can be snapped into place on a relatively heavy sinker body and so that a protruding interior edge portion of the retaining clip bow will fit physically in the outer edge of the sinker body slot when the clip is in alignment with the slot. The clip is sufficiently flexibly deformable so that when the clip and the body are rotated relatively to each other, the protruding interior edge portion will come out of the body slot and will slide on the face of the sinker to position the clip to allow a fish line to be introduced into the central body opening through the body slot or to be separated therefrom.

In one form of the invention, ball or bead receiving cavities are provided in the fish line retaining clip ears of shape and position to encompass the balls of a metallic fish leader or beads which have been permanently strung on a fish line.

IN THE DRAWINGS

FIG. 1 is a side elevational view of a fish line sinker made in accordance with a first form of the invention showing its relationship to a fish line;

FIG. 2 is a top plan view of the fish line sinker of FIG. 1;

FIG. 3 is a top plan view of the sinker of FIGS. 1 and 2 as seen in FIG. 2 but with a fish line retaining clip shown in position to allow release of the fish line from the sinker;

FIG. 4 is an enlarged vertical sectional view taken on the line 4—4 in FIG. 2;

FIG. 5 is a horizontal sectional view taken on the line 5—5 in FIG. 4;

FIG. 6 is a side elevational view of a fish line sinker made according to a second form of the invention shown in relationship to a fish line leader consisting of a plurality of spaced apart mutually swivel mounted metallic balls;

FIG. 7 is an enlarged horizontal sectional view taken on the line 7—7 in FIG. 6;

FIG. 8 is a vertical sectional view taken on the line 8—8 in FIG. 7;

FIG. 9 is a vertical sectional view similar to that shown in FIG. 8 but showing the relationship of the fish line sinker of the second form of the invention to a fish line and to beads freely slidably mounted on the fish line; and FIG. 10 is a horizontal sectional view taken on the line 10—10 in FIG. 9.

DESCRIPTION OF PREFERRED EMBODIMENTS

First Form of the Invention

A fish line sinker 10, made in accordance with a first form of the invention includes a sinker body 12, and a fish line retaining clip 14 pivotally mounted through the instrumentality of retaining clip ears 16,16 with respect to a central, generally cylindrical, longitudinally extending opening 18 provided through the longitudinal axis of the sinker body 12.

In addition to this central longitudinal opening 18, the sinker body 12 is also provided with a longitudinally extending slot 20 which opens from outside of the body to the central cylindrical opening 18.

The fish line retaining clip 14, in addition to ears 16,16, includes transversely extending arms 22,22 which are integral with ears 16,16 and are connected to each other by a longitudinally extending connecting bow 24.

As seen in FIGS. 2, 3, 4 and 5, the retaining clip ears 16 are provided with a fish line receiving slot 26 therethrough.

The sinker body 12 can be made of lead or any other usual or preferred relatively heavy material. The fish line retaining clip is preferably made of a firm, resilient plastic having the properties of nylon, for example, which can be distorted to allow the retaining clip ears 16,16 to be initially snapped into place in the central longitudinally extending cylindrical opening 18 in the sinker body 12.

As best seen in FIGS. 4 and 5, the connecting bow 24 is so constructed that when a protruding interior edge portion 28 of the bow is aligned with the sinker body slot 20, the resiliency of the retaining clip will firmly hold that edge portion 28 in closing alignment with the slot 20 until such time as the retaining clip 14 and the sinker body 12 are forceably rotated with respect to each other.

Operation of Sinker of First Form of Invention

In order to install the fish line sinker 10 of the first form of the invention on a fish line 30, the retaining clip 14 is forceably rotated manually with respect to the sinker body 12 to position as seen in FIG. 3. This position of the retaining clip 14 is indicated in dotted lines in FIG. 1.

The fish line 30 is then inserted through the sinker body slot 20 to take position in the fish line receiving slots 26,26 of the retaining clip ears 16,16, as seen in FIG. 3. The retaining clip 14 is then rotated with respect to the sinker body 12 to the position as seen in FIGS. 2, 4 and 5 and as seen in full lines in FIG. 1. Although illustrated as fitting snugly, it is to be understood that the clearance between the fish line receiving slot 26,26 and the wall of the central longitudinally extending cylindrical opening 18 in the sinker body 12 is such that the fish line 30 can slide freely with respect to the sinker 10; or, perhaps more properly, the sinker 10 can slide freely up and down the fish line.

When it is desired to remove the sinker 10 from the fish line 30, as when a larger or smaller sinker is to be used, or so that no sinker will be used, it is necessary only to rotate the retaining clip 14 with respect to the sinker body 12 back to the position as seen in FIG. 3. The fish line 30 will then be easily removed from the sinker, or, more properly, the sinker will be removed from the fish line.

It is evident that there is no need to detach the fish line from the fishing rod and reel on one end thereof or from the leader and/or bait at the other end thereof in order to install and/or remove a fish line sinker such as fish line sinker 10. With repeated installations and removals there will be no appreciable wear or damage to the line or sinker.

Second Form of the Invention

As seen in FIGS. 6 through 10, a fish line sinker 110 includes a sinker body 112 and a fish line retaining clip 114 pivotally mounted to the body 112 through the instrumentality of retaining clip ears 116,116 which are pivotally mounted with respect to a central, generally cylindrical, longitudinally extending opening 118 provided in the sinker body 112.

In addition to this longitudinally extending opening 118, the sinker body 112 is also provided with a longitudinally extending slot 120 open from the opening 118 to outside of the sinker body 112.

Each of the clip retaining ears 116,116, is integral with a transversely extending arm 122 of the fish line retaining clip 114; and each of these arms is connected to the other by a longitudinally extending connecting bow 124.

As seen in FIGS. 7 through 10, each of the ears 116 is provided with a fish line receiving slot 126, and each such slot is provided with a part-spherical ball or bead receiving cavity 125 in concentric alignment with the longitudinal axis of the fish line receiving slots 126,126.

The fish line sinker 110 of the second form of the invention can be fixedly mounted with respect to a fish line leader chain 127 made up of a plurality of spaced apart, mutually swivel mounted, metallic balls 120 connected by narrow, substantially cylindrical links 131, as seen in FIGS. 6, 7 and 8. The leader chain 127 can be attached to a fish line 130 on which are freely slidably mounted two hollow beads 132,132. When it is desired to fasten the sinker 110 to run freely on the fish line 130, the sinker can be removed from the leader 127 and mounted on the beads. There will be very little friction between the fish line 130 and the beads 132. This mounting is seen in FIGS. 9 and 10. In this configuration, the leader 127, still connected to the fish line 130, serves as a swivel.

As in the case of the first form of the invention, a protruding interior edge portion 128 of the fish line retaining clip connecting bow 124 of shape to come into contact with the outer edge of the longitudinally extending slot 120 in the sinker body 112 for the purpose of maintaining the fish line sinker 110 in surrounding relationship with respect to the fish line leader chain 127 or the fish line 130 and beads 132 until such time as the clip 114 is forceably manually rotated with respect to the sinker body 112 to allow the fish line leader or the fish line to be removed from the sinker or vice versa.

Operation of Sinker of Second Form of Invention

With the sinker body 112 positioned in 180° rotation with respect to the fish line retaining clip 114 as seen in FIG. 7 (in other words positioned relatively to each other as sinker body 12 and fish line retaining clip 14 are positioned in FIG. 3 in the first form of the invention), the fish line leader chain 127 will be moved through the then open longitudinally extending slot 120 and two of the spaced apart metallic balls 129 which exactly line up with the two ball or bead receiving cavities 125,125 are forced into those cavities. The fish line retaining clip 114 is then rotated with respect to the sinker body 112 to position as seen in FIG. 7. This causes ears 116,116, to fixedly position the fish line leader chain 127 with respect to the fish line sinker 110, as is evident from FIG. 8.

To remove the fish line sinker 110 from the leader 127, the retaining clip 114 will again be rotated 180° with respect to the position shown in FIG. 7, and the leader chain will be removed from the fish line sinker through the slot 120.

To mount the fish line sinker 110 on a fish line 130 so that the sinker slides freely on that line, two or more beads 132 will be installed on the line between the leader and bait on the one hand and the rod and reel on the other hand. To install the sinker 110, the retaining clip 114 is rotated with respect to the sinker body 112 to open the sinker body slot 120, and the fish line 130 is inserted into the slot. The beads 132 on the fish line 130 are then inserted or forced into the ball or bead receiving cavities 125,125, and the retaining clip is rotated to the position as seen in full lines in FIG. 10. The protruding interior edge portion 128 of the longitudinally extending bow 124 of the retaining clip 114 comes to rest in the outside edge of the sinker body slot 120 and prevents escape of the fish line 130 and the beads 132,132 until such time as the clip and sinker body are forceably rotated with respect to each other to open the slot 120.

The relationship of the opening through beads 132 with respect to the diameter of the fish line 130 will be such that the fish line will run freely through the beads 132 and will, consequently, run freely with respect to the fish line sinker 110. The beads can be of any usual or preferred material suitable for the purpose, and specifically, can be of a material which will have less abrasive effect on the fish line 130 than would the various other parts of the fish line sinker. For example, when properly constructed, the fish line sinker 110 supporting beads 132,132 of the second form of the invention will cause less wear on fish line 130 than the fish line sinker 10 will cause on fish line 30 of the first form of the invention running in direct frictional relationship with respect to the sinker body 12 and the fish line retaining clip 14.

In both forms of the invention, the fish line retaining clips closely follow the contour of the outside surface of their respective sinker bodies. Likewise, the ears substantially completely fill the central, generally cylindrical, longitudinally extending openings through the sinker bodies, and the fish line receiving slots in each of the ears is of configuration to lie in closely adjacent relationship with respect to the encompassed fish line.

Some of these relationships have been somewhat opened up for the purposes of clear illustration in FIGS. 2, 3, 5, 7 and 10; but in actual practice, these clearances have been found to be such that virtually all sand and sediment and other deliterious materials which normally impede the free sliding of a fish line sinker with respect to a fish line are prevented from so impeding the action of the fish line sinkers 10 and 110 with respect to the fish lines 30 and 130. Perhaps even more important, the structures are such that the sinker-line combinations are virtually weedless when in operation.

The embodiments of the invention in which an exclusive property or privilege is claimed are defined as follows:

1. A fish line sinker including:
   A. a sinker body having a central longitudinal opening extending therethrough and having a longitudinally extending slot open from the central opening to the outside of the sinker body from one end of the central opening to the other;
   B. a fish line retaining clip having an ear pivotally mounted with respect to each end of the sinker body central opening and having a longitudinally extending bow integrally connected between said ears;
   C. means tending to maintain said retaining clip in alignment with said sinker body slot, said means being manually disengageable to effect rotation of said body with respect to said clip;
   D. each of said retaining clip ears being provided with a fish line receiving slot outwardly positioned on its ear of shape and size to receive a fish line and to position it within said sinker body central opening when said clip is aligned with said body opposite said longitudinally extending sinker body slot and said fish line receiving slots in said retaining clip ears being of shape and size to confine the fish line within the body central opening when the retaining clip is aligned with the sinker body slot; and
   E. said retaining clip ears each being provided with a part spherical cavity in concentric alignment with its line receiving slot, said cavities and said slot being of configuration to snugly receive a fish line and a pair of cylindrical balls situated in concentric alignment with said fish line.

2. The fish line sinker of claim 1 wherein:
   F. the central longitudinal opening in sinker body is cylindrical;
   G. the outer surface of the sinker body is symmetrical around the axis of said central opening; and
   H. said retaining clip is of configuration to move snugly around and in contact with said sinker body outer surface as clip and body are rotated with respect to each other.

3. The fish line sinker of claim 2 wherein:
   I. said clip ears, the fish line receiving slots in those ears and the outer end portions of said sinker body central opening are so related to the diameter of a fish line to be fastened thereon that entrance of deleterious materials into the central opening is substantially entirely prevented.

* * * * *

UNITED STATES PATENT AND TRADEMARK OFFICE
CERTIFICATE OF CORRECTION

PATENT NO. : 4,235,037
DATED : November 25, 1980
INVENTOR(S) : John W. Sivertsen It is certified that error appears in the above-identified patent and that said Letters Patent are hereby corrected as shown below:

Column 4, line 9, "120" should be --129--.

Signed and Sealed this

Twenty-fourth Day of February 1981

[SEAL]

Attest:

RENE D. TEGTMEYER

Attesting Officer

Acting Commissioner of Patents and Trademarks